(12) United States Patent
Pohorecki

(10) Patent No.: US 6,905,080 B2
(45) Date of Patent: Jun. 14, 2005

(54) PRESSURE WASHING APPARATUS AND METHOD

(76) Inventor: Tony Pohorecki, 5739 - 203rd A Street, Langley, B.C. (CA), V3A 1W7

( * ) Notice: Subject to any disclaimer, the term of this patent is extended or adjusted under 35 U.S.C. 154(b) by 120 days.

(21) Appl. No.: 10/273,870

(22) Filed: Oct. 17, 2002

(65) Prior Publication Data

US 2003/0071142 A1 Apr. 17, 2003

Related U.S. Application Data

(60) Provisional application No. 60/344,496, filed on Oct. 17, 2001.

(51) Int. Cl.[7] .............................................. A62C 31/24
(52) U.S. Cl. ..................... 239/280; 239/280.5; 239/281
(58) Field of Search ................................ 239/276, 280, 239/280.5, 281

(56) References Cited

U.S. PATENT DOCUMENTS

| | | |
|---|---|---|
| 3,083,041 A | 3/1963 | Owenmark |
| 3,754,781 A | 8/1973 | Conroy |
| 3,895,832 A | 7/1975 | Ellis et al. |
| 3,915,382 A | 10/1975 | Davis |
| 4,013,225 A | 3/1977 | Davis |
| 4,182,364 A | 1/1980 | Gilbert et al. |
| 4,204,292 A | 5/1980 | Lester |
| 4,223,702 A | 9/1980 | Cook |
| 4,615,487 A | 10/1986 | O'Brien et al. |
| 5,007,753 A | 4/1991 | England |
| 5,078,349 A * | 1/1992 | Smith ...................... 248/125.8 |
| 5,133,503 A | 7/1992 | Giordano |
| 5,186,392 A | 2/1993 | Pleshek |
| 5,221,113 A | 6/1993 | Stoll |
| 5,390,695 A | 2/1995 | Howard |
| 5,462,315 A | 10/1995 | Klementich |
| 5,799,835 A | 9/1998 | Gobbel |
| 5,823,578 A | 10/1998 | Chiou |
| 6,009,611 A | 1/2000 | Adams et al. |
| 6,045,284 A | 4/2000 | Chiu |
| 6,158,678 A | 12/2000 | Lange |
| 6,168,212 B1 | 1/2001 | Finley |
| 6,257,256 B1 | 7/2001 | Fischer |

FOREIGN PATENT DOCUMENTS

| | | |
|---|---|---|
| DE | 3626997 A | 2/1988 |
| FR | 2791583 A | 10/2002 |
| GB | 765218 A | 1/1957 |

* cited by examiner

Primary Examiner—Thomas Denion
Assistant Examiner—Diem Tran
(74) Attorney, Agent, or Firm—Robert B. Hughes; Hughes Law Firm, PLLC

(57) ABSTRACT

A pressure washer apparatus and method comprising a telescoping tube section which contains a hose. There is a forward outlet section having an outlet housing with a quick disconnect to the forward end of the hose in the telescoping tube section. A control section is located at the rear end of the telescoping tube section and makes a second quick disconnect connection to the hose. Releasable connectors are provided for the tube sections to lock the tube sections in place, and these comprise tapered threaded gripping fingers which combine with a locking nut with the threads of the two of the gripping fingers, and the locking nut having a taper end and thread configuration enabling the connection to be accomplished by only a very short rotation of the compression nut.

9 Claims, 5 Drawing Sheets

PRESSURE WASHING APPARATUS AND METHOD

CROSS-REFERENCE TO RELATED APPLICATIONS

The present application claims benefit of U.S. Provisional Application No. 60/344,496, filed Oct. 17, 2001, entitled "PRESSURE WASHING APPARATUS AND METHOD".

BACKGROUND OF THE INVENTION

1. Field of the Invention

The present invention relates to a method and apparatus for pressure washing where the washing is accomplished in a manner that the water is dispensed at a less accessible location, such as delivering the water through an elongate telescoping tube to upper elevations of windows or buildings.

2. Background Art

There are many situations where it is desirable to wash windows, walls, or other structures where the workers accomplishing the washing are at a ground elevation, and the pressurized water is dispensed at an upper location with washing implements or discharge apparatus or other devices being positioned at the higher location. Quite often, this is done by means of an elongate tube defining a hose carrying passageway. The hose is inserted into the passageway with the water being discharged from the hose at the upper end of the tube, and the hose extending from the lower end of the tube to the upper end portion thereof. The tube may be a telescoping tube section which is either increased in length or shortened by adjusting the relative position of the tube members that make up the telescoping tube section.

In accomplishing the washing, there are various operations which often must be performed in addition to the actual washing. This can involve such things as removing and replacing the hose, retracting, partially retracting, or extending the tube sections, locking the tube sections in place, supporting the telescoping tube section, placing different water discharge devices or implements, etc. These are time consuming and sometimes have inconveniences associated with the same. It is toward problems such as these that the present invention is directed. A search of the patent literature has shown a number of patents relating to such pressure washing systems and other mechanical devices that are used in the present invention. These are as follows.

U.S. Pat. No. 5,390,695 (Howard), shows a "Reel Assembly for Hose" which comprises a circular-shaped housing in which is wound a hose on a reel, and the hose extends outwardly through a telescoping support member. The upstream end of the hose is connected to a fitting in the reel and then the fitting makes a connection to another connection to the faucet.

U.S. Pat. No. 6,257,256 (Fischer) discloses a device for cleaning gutters. There is an elongate telescoping pole which is tubular, and a water hose extends through the telescoping pole and then through an end fitting 38 which is generally U-shaped. At the exit end of the fitting 38 there is a water discharge member in the configuration of a fork with three discharge tubes that are pivotally mounted at 34 (see FIG. 3) to the end fitting.

U.S. Pat. No. 6,158,678 (Lang) discloses an apparatus for cleaning various wall surfaces. There is a telescoping pole having at its upper end the cleaning device that is pivotally connected to the pole and discharges high-pressure water (cleaning fluid) at locations so that the cleaning member stays properly oriented to the wall.

U.S. Pat. No. 5,799,835 (Gobbel) shows an extension device for a spray can where the spray can would be used, for example, in killing insects or lubricating shutters on the outside of a house. There is an extension apparatus that is connected to the spray can, and the extension apparatus has upper end dispensing portions.

U.S. Pat. No. 5,186,392 (Pleshek) discloses an apparatus particularly adapted for cleaning interior building surfaces. There are telescoping pipe elements 13 and 31 that are locked together by a collar 59. A feature of this device is the use of self-coiling hose sections within the telescoping pipes.

U.S. Pat. No. 5,133,503 (Giordano et al.) discloses an elongate handle which is connected into a socket that is in turn connected to a nozzle fitting at the end of a hose.

U.S. Pat. No. 5,007,753 (England, Jr.) shows a window cleaning nozzle in which the hose 14 passes through a side opening in the handle and extends through the end part of the handle to the cleaning nozzle.

U.S. Pat. No. 4,223,702 (Cook) shows a telescoping pipe which houses a corrugated extendable hose which collapses axially within the telescoping pipe sections.

U.S. Pat. No. 4,013,225 and U.S. Pat. No. 3,915,382 (both issued to Davis) are related applications. There is shown a telescoping pipe handle device. The control is located on the lower part of the pipe at 18 to control a flow through the nozzle.

U.S. Pat. No. 6,168,212 B1 (Finley) shows a twist-lock connector for interlocking telescoping tubular members, and the specific application which is mentioned in the introduction of the patent is for telescopic vacuum cleaner tubes. As described in column 5, beginning on line 55, the twist-lock connector is put into its locking position by rotating the rotatable member 40 in a first direction until the first and second canting surfaces 41A and 41B engage the first and second seating member canting surfaces 25A and 25B to cause the seating members 26A and 26B to frictionally engage the outer surface 82 of the second tubular member 80.

U.S. Pat. No. 6,045,284 (Chiu) discloses an extensible cleaner rod, and the prior art rod is shown in FIGS. 5 and 6. The apparatus which is being patented can best be seen in FIG. 1, and there is a connection where there are fingers 113 which are compressed by the surface of a nut 12 to make a tight connection between the tubular members. The substance of this patent is to provide an outer tube and an inner tube telescoped inside one another, and then a water guide tube of a smaller diameter than that of the inner tube.

U.S. Pat. No. 5,823,578 (Chiou) discloses a telescoping cleaning wand in which a tapered spread ring 7 is compressed by a nut 8 which has an inner non-threaded tapered portion.

U.S. Pat. No. 4,182,364 (Gilbert et al.) shows an adjustable length riser in a toilet tank where there is a connection for a telescoping member where there is a nut (see FIG. 6) that has cylindrical threads and a second portion with a tapered interior surface. The tapered surface 96 engages fingers to cause frictional engagement between the two members.

U.S. Pat. No. 3,083,041 (Owenmark) discloses a locking device for telescopically fitting parts, such as used in a vacuum cleaner. There is an exteriorly threaded hollow sleeve member 20 which fits around the pipe 16 with a lug or lugs 21 in the member 20 fitting in a matching recess 19 so that this sleeve member is non-rotatable and actually becomes part of the pipe 16. The sleeve member is severed at one location along its circumference and is somewhat resilient so that it can be expanded moderately to fit over the cone-shaped end member 18 to fit around the pipe 16. The intermediate member 22 is resilient and is slotted from opposite ends so that it is moderately expandable and compressible.

U.S. Pat. No. 5,462,315 (Klementich) shows in pages 5–10 of the drawings various types of threads with various dimensional relationships.

U.S. Pat. No. 6,009,611 (Adams et al.) discloses a pipe connection where it possible to detect wear between the pin-and-box joints.

U.S. Pat. No. 3,895,832 (Ellis et al.) shows a "Collet Compression Connection" which can best be seen in FIGS. 3 and 4. The member 20 has interior threads 24 which are tapered, and these join to a pipe directly or through a fitting. At the other end of this fitting 20, there are exterior threads which appear to be non-tapered, and extending axially from this portion are circumferentially spaced collet fingers 36. There is a nut 16 which engages the threads and also has a tapered interior surface which grips the collet fingers 34 to press them inwardly into engagement with the other pipe member P.

U.S. Pat. No. 3,754,781 (Conroy) discloses a pipe joint where there is a threaded joining member which has interior threads that join to one pipe section, and an interiorally tapered section which engages an inner tapered section that has threads which cut into a plastic pipe or the like to form a connection.

U.S. Pat. No. 4,204,292 (Lester) discloses a portable scrubbing tool where there is a main support pole 21 and an auxiliary support pole 29 pivotally connected to the main pole 21 toward an upper end thereof. The auxiliary support pole 29 is described in column 6, beginning on line 10 and continuing on through the bottom of column 6 and up to the top part of column 7. Then on line 6 of column 7, the method of using the two poles 21 and 29 is described. This states that the operator will hold the main pole 21 in one hand, and auxiliary support poles 29 in the other hand. He then applies the brush member 3 to the surface to be cleaned.

SUMMARY OF THE INVENTION

The present invention relates to a pressure washing apparatus and also a method related to the same.

In the overall system of the present invention, there is provided a telescoping tube section having a rear end portion and a forward end portion, and also defining a hose carrying passageway. The tube section has a longitudinal center axis extending along the tube passageway, and the tube section comprises of at least a rear tube member and a front tube member.

There is a control section located at the rear end portion of the telescoping tube section, and this control section has a water supply inlet connector adapted to be connected to a water supply line and a hose inlet connector adapted to be connected to a rear end of the hose that extends through the telescoping tube section. Also, there is a control mechanism to control water flow from the water supply inlet connection to the hose inlet connector.

There is a forward outlet section comprising an outlet housing removably mounted to the forward end portion of the telescoping tube section. The forward outlet section has a hose outlet connection arranged to have a releasable connection to a forward outlet end of the hose in the hose passageway, a water discharge outlet, and a water outlet passageway from the hose outlet and the water discharge outlet.

This arrangement provides various conveniences. First, it is relatively easy to remove the hose from the telescoping tube section and also replace it back into the telescoping tube section. This can be accomplished by positioning the housing of the outlet section in a position where the outlet end of the hose can be disconnected from the forward outlet section, withdrawing the hose from the telescoping tube section and disconnecting the inlet end of the hose from the water supply section. Thus, the hose could be rolled up and stored separately, and the telescoping tube section can be collapsed and also stored. Repair and replacement of the hose can be readily accomplished.

There is also provided a releasable connection by which telescoping tube members can be easily connected and locked in place and also disconnected.

This releasable connection comprises a tube engaging section, which in turn comprises a rearwardly positioned sleeve portion arranged to extend substantially around the first tube and be secured thereto, and also a forwardly positioned gripping portion having a forward end portion and a rear end portion. The gripping portion comprises a plurality of gripping fingers arranged to be positioned at spaced circumferential locations. Each of the fingers has a rear base end connected to the sleeve portion, a forward end finger portion, and an interior gripping surface.

The gripping portion has a tapered outer surface portion comprising outer tapered surface portions of the gripping fingers. Each outer tapered surface portion slopes in a forwardly and longitudinally inward taper toward the forward end finger portion of the gripping portion.

The outer tapered surface of the gripping portion is formed with exterior threads which follow the taper of the outer tapered surface so that the outer diameter of the exterior threads increase in a rearward direction, with the exterior threads extending across and through the outer tapered surface portion of the gripping fingers.

The releasable connection also comprises a compression nut having a tapered inwardly facing compression surface arranged to extend forwardly around the gripping portion. The tapered inwardly facing compression surface of the compression nut has interior threads tapering outwardly in a rearward direction and being arranged to come into threaded engagement with the exterior threads of the forward gripping portion. Thus, by rotating the compression nut, the gripping fingers are caused to deflect inwardly into gripping position.

It has been found in the present invention that with this particular connection, it is only necessary to rotate the compression nut about one-quarter to one-half of a full revolution (i.e., 90 degrees to 180 degrees) to effectively cause engagement and disengagement to and from the locking relationship.

Further, the same release connection is effectively used in the preferred embodiment to enable the outlet section to be engaged and disengaged conveniently with the outer working end of the telescoping tube section.

In accordance with another feature of the present invention, there is provided in another embodiment a connector that is particularly adapted to make a threaded connection with different members having variously sized and/or shaped threaded sockets.

The connector has a longitudinal center axis, a forward end, a rear end, and a surrounding threaded surface portion comprising a forward threaded end portion and a rear threaded end portion. With these forward and rear threaded end portions comprising a plurality of outwardly facing thread members.

The thread portions are connected in a generally helical pattern, with a radial dimension of the thread members of the forward threaded end portion generally increasing at a first rate of increase which is greater than zero in rearward direction from a forward end of the forward threaded end portion to a more rearward location of the forward threaded end portion, and with the rear threaded end portion having a radial dimension which is characterized that any rate of increase in the radial dimension in a forward to rear direction is less than the rate of increase in the forward threaded end portion.

The threaded members of the forward threaded end portion and the rear threaded end portion each have a radially outwardly facing perimeter surface. The perimeter surfaces of the forward threaded end portion have an inwardly and forwardly extending slope relative to the longitudinal axis at an angle of slope measured in a geometric plane passing through the longitudinal center axis, and any slope of the perimeter surfaces of the thread members of the rear threaded end portion are characterized in that any inwardly and forwardly extending slope of the threaded members of the rear threaded end portion is less than the slope of the forward threaded end portion.

In an exemplary embodiment, the slope of the forward threaded end portions is about twelve degrees, and the slope of the rear threaded end portions is about three degrees. Thus, if the socket with which the connection is being made is somewhat small, the forward threaded end portion is able to make a proper connection. In the instance where the socket is somewhat larger and/or possibly worn, then the forward threaded end portion having a greater slope is better able to male an entry into the socket, and with the rear threaded end portions being able to make the connection.

In another embodiment of the present invention, there is provided a telescoping support tube section having a lower base end to engage the ground surface and an upper swivel end to engage the telescoping tube section at a location forwardly of the rear end portion of the telescoping tube section to provide vertical support. In another version of this further embodiment, there are provided two telescoping support sections which are spaced laterally from one another at the base ends to provide lateral support. Further, when the apparatus is not being operated, but is yet in the operating position, the apparatus is stable since the three points of the rear end of the telescoping tube section being in the ground and the two base ends of the support tube sections form a triangular base support.

In the method of the present invention, the apparatus is provided as described above. The hose is positioned in the hose making the releasable connections at the outlet section and also adjacent to the control section by releasable connecting means, and the apparatus can be operated in the manner described above. Further, for either inserting or replacing the hose from or into the telescoping tube section, this can be accomplished rather easily by making the connections or releases of the two connecting ends of the hose. To disconnect the front end of the hose from the outlet section, the outlet housing is removed from the forward end of the telescoping tube section to provide access to the forward connector, so that the disconnect can be accomplished.

Also, in the method of the present invention, there is provided in addition to the telescoping tube section, either one or two of the telescoping support tube sections with the swivel connections being made, and with the base end or ends of the support tube section or sections being properly positioned for providing support. The operator at the control end is able to manipulate the rear end portion of the telescoping tube section in order to properly position the dispensing end of the apparatus, and one or more support workers can position the support tube section or sections and either lower or extend the same.

Also, the telescoping tube section can be lengthened or extended rather easily by placing one or more of the releasable connectors in the release position, simply by making a quarter to a half turn and then retracting or extending the tube members as needed, followed by placing the connectors back into the locking position.

Other features of the present invention will become apparent from the following detailed description.

DETAILED DESCRIPTION OF THE PREFERRED EMBODIMENTS

Figure 1:
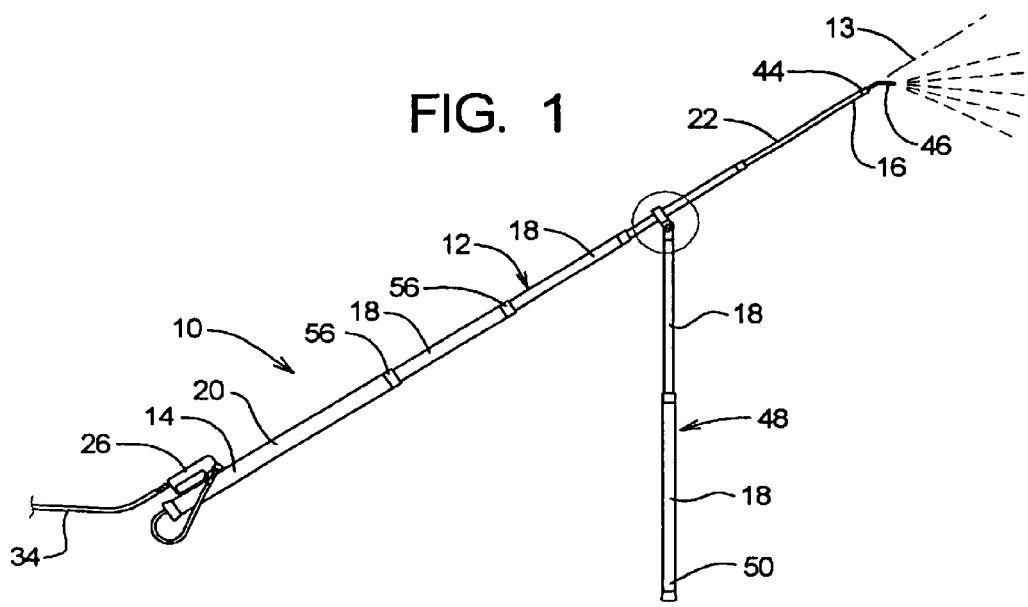
FIG. 1 is a side elevational view showing the overall apparatus of the present invention in its operating position with an optional support tube.
Figure 2:
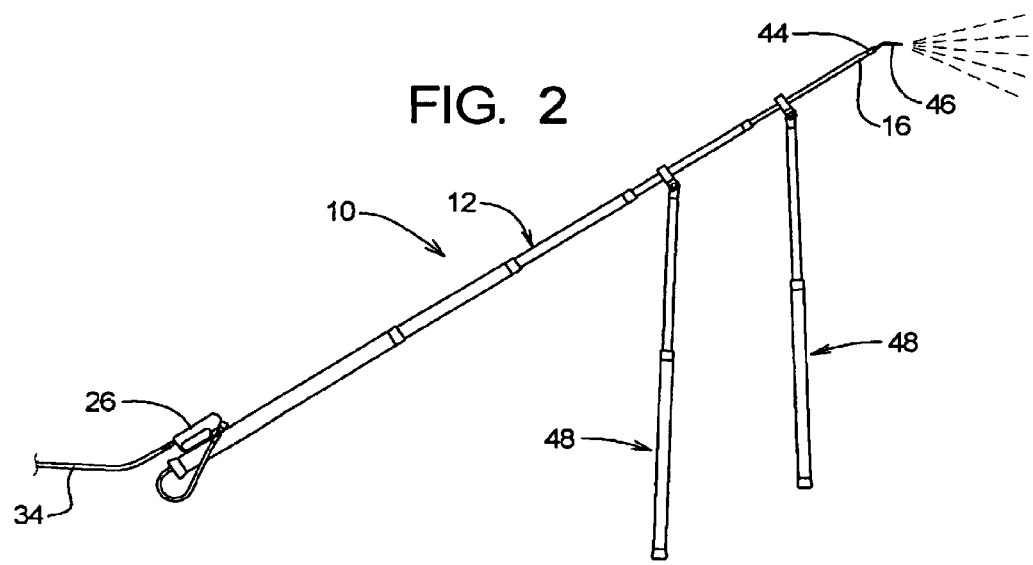
FIG. 2 is also a side elevational view similar to FIG. 1, showing the apparatus of the present invention with two optional support tubes.
Figure 3:
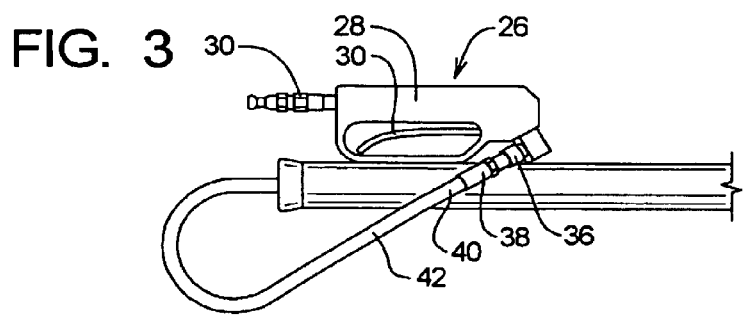
FIG. 3 is a side elevational view showing the base operating end and control section of the apparatus.

The apparatus 10 of the present invention will be first given as an overall description with reference initially to FIGS. 1, 2, and 3. FIG. 1 shows the apparatus in a side elevational view in its operating position. This apparatus 10 comprises a main telescoping tube section 12 having longitudinal axis 13, a rear base end 14, and a forwardly positioned working end 16. The telescoping tube section 12 comprises a plurality of elongate cylindrically shaped metal tube members 18 (e.g., aluminum tube members), with the rearmost base end tube member and the forwardmost working end tube member being designated 20 and 22, respectively. The tube members 18 collectively define a hose passageway 24 extending the length of the telescoping tube section 12 (se FIGS. 3, 4, 5 and 6).

At the base end 14, there is a control section 26 which comprises a control handle 28 (see FIG. 3) which is adapted to be manually grasped, which has a manually operated trigger 30. The handle 28 is screwed to or otherwise connected to the rear end of the base end tube member 20.

The handle 28 has an inlet end connection 32 which is adapted to be connected to a water supply line 34 (see FIG. 1), and an outlet end connector 36 which has a releasable connection to a hose end connector 38, that in turn connects to an inlet end 40 of the hose 42 (see FIG. 3).

At the outer working end of the telescoping tube section 12, there is a working end section 44, and as shown herein there is a nozzle outlet member 46 to discharge water that is delivered through the hose 42 that is positioned in the telescoping tube section 12 (see FIG. 3).

Figure 15:
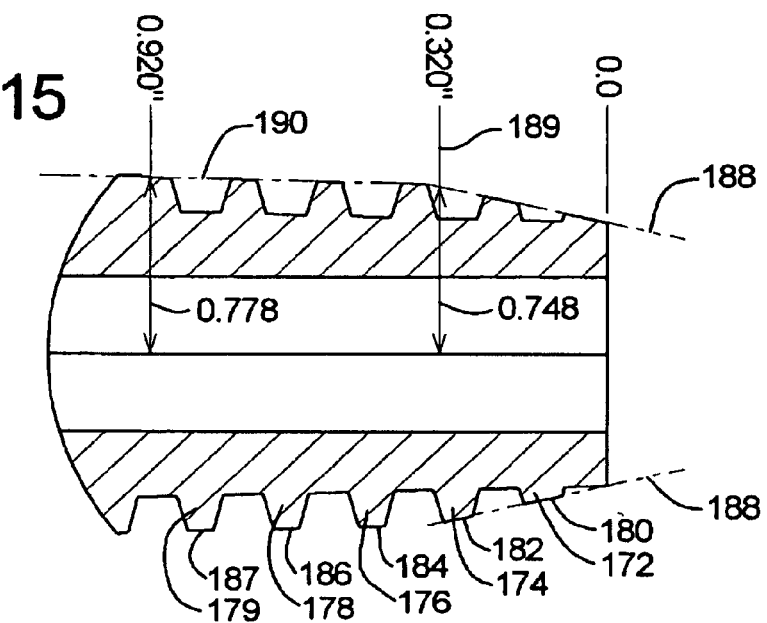
FIG. 15 is a sectional view taken across a portion of the threads of the connecting portion of the connector shown in FIG. 14, and giving various configuration and dimensional relationships.

In FIG. 1, there is shown an auxiliary telescoping support tube 48 having a lower base end 50 supported from the ground surface, and an upper support end 52 which has a swivel connection 54, shown in more detail in FIG. 15 and circled in FIG. 1. This support tube has substantially the same basic construction as the telescoping tube section 12.

In FIG. 2, there is shown the same apparatus 10 as shown in FIG. 1, except that there are shown two auxiliary telescoping support tubes 48, each having a swivel connection 50, and connected at longitudinally spaced locations on the telescoping tube section 12.

With the single support tube 48, shown in FIG. 1, the telescoping tube section 12 is supported at its outer middle portion, thus enabling the person handling the apparatus 10 at the control section 26 much easier. As the working end 44 of the apparatus 10 is moved between upper and lower locations, as needed, the auxiliary support tube 48 can be either extended or contracted, and while there are shown only two telescoping sections 18, more could be provided.

In the arrangement of FIG. 2, with the two auxiliary support tubes 48, there are the same benefits as described relative to the single support tube 48 in FIG. 1, but there is also the benefit that lateral stability is provided. Also, in the event that it is necessary for the person or persons operating the apparatus 10 to momentarily perform some other task, the rear end of the tube section 12 can simply be lowered to a ground engaging location, and there is vertical and lateral support provided from the two auxiliary support tubes 48 to maintain the apparatus 10 in its operating position.

In operation, there could be two persons, one operating the control section 26 and moving the base end 14 of the tube assembly 12, or two or three persons altogether with one operating the control section 26 and the other one or two maneuvering the one or two auxiliary support tubes 48, with the full length of the tube section 12 being as much as twenty to thirty feet or greater.

Each tube member 18 has at its forward end a locking connector 56 which is made of a plastic material, and, which for convenience in the following description will simply be called the "connector 56". This connector 56 comprises (see FIGS. 4, 5, and 6) a tube engaging portion 58 and a compression nut 60. The tube engaging section 58 in turn comprises a rearwardly positioned sleeve portion 62 having an inner surface 64, and rear and forward end portions 66 and 68. The tube engaging section 58 also comprises a forwardly positioned gripping portion 70, having rear and forward end portions 72 and 74, respectively, and an inner surface 76.

The sleeve portion 60 of the tube engaging section 58 is fixedly connected to the forward end portion 78 of the tube member on which the connector 56 is located (e.g., by a set screw or bonding). The tube end portion 78 has an outer surface 80 which engages the inner surface portions 64 and 76 of the sleeve portion 62 and the gripping portion 70 of the tube engaging section 58. Also, the forward end tube portion 78 has a front circular edge 82 which is at the same location longitudinally as the front edge 84 of the gripping portion 70 of the tube engaging section 58.

The outer surface 86 of the gripping portion 70 of the tube engaging section 58 has its outer surface formed with a forward and inward moderate taper having the overall shape of a truncated cone. This outer tapered surface is formed with helical threads 88 which also have the same forward and inward taper of the surface 86.

Figure 4:
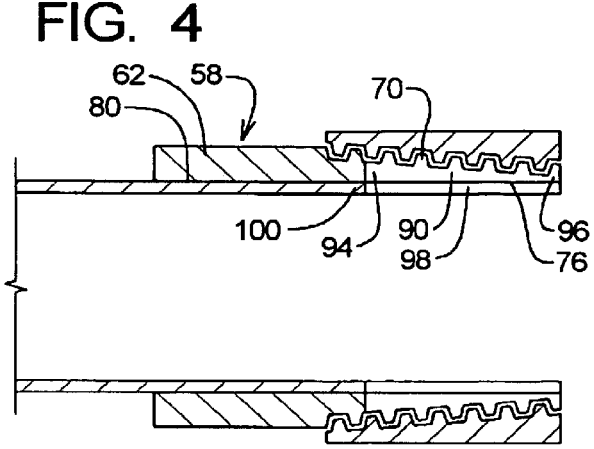
FIG. 4 is a longitudinal sectional view of a connector of the present invention.
Figure 5:
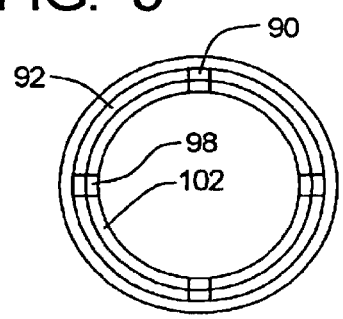
FIG. 5 is an end view looking toward the open end portion of the connector shown in FIG. 4.

Further, it will be noted with reference to FIGS. 4 and 5, that the gripping portion 70 is formed with a plurality of longitudinally extending slots 90 that extend from the outer edge 84 of the gripping section 70 to the rear end portion of the gripping portion 70. As shown in FIG. 5, these slots 90 are at equally spaced intervals, 90 degrees apart from one another, and these slots 90 thus form the gripping portions 70 into four circularly curved gripping fingers 92, each of which has a base end 94 connected to the forward end of the sleeve portion 62, and a forward end 96.

Figure 6:
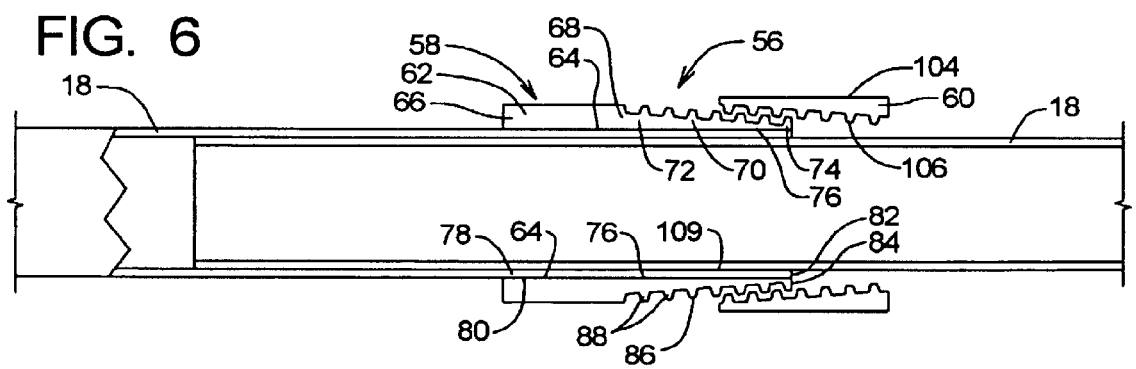
FIG. 6 is a view similar to FIG. 4, showing the connector of FIG. 4 in its operating position connecting two end portions of two telescoping tube members.

Also, it will be noted by observing FIGS. 4, 5, and 6, that the forward end tube portion 78 of the tube 18 also has longitudinally extending tube slots 98 which are aligned with the slots 90, and extend with the slots 90 to a base location 100 at the same location that the slots 90 terminate at their rear ends. The forward end portion 78 is formed with four tube fingers 102.

The slots 98 and 90 can be formed simultaneously by first mounting the tube engaging section 58 to the forward end portion 78 of the tube member 18, and then making four cuts through both the gripping portion 60 and the tube end portion 78 simultaneously, thus forming both sets of slots 90 and 98. This could be done by placing the tube member 18 and the tube engaging section 58 in a jig and moving the cutting tool to different angular positions to make the spaced slots 90 and 98.

The compression nut 60 is desirably made of metal (e.g., aluminum), and has an outer cylindrical surface 104 which is knurled so that it can be better gripped, and an interior threaded surface 106. This threaded surface is made up of thread portions or components 108 which overall are formed with a forward and inward taper or slant, which defines a generally frustoconical surface. These threaded portions 108 have a helical configuration matching that of the threads 88 that are formed on the outer surface of the gripping portion 70 of the tube engaging section 58.

To describe the operation of this connector 56, reference is now made to FIG. 6. As in FIG. 4, there is shown the forward end portion 78 of the tube member 18, and also the tube engaging section 58 and the compression nut 60, with the compression nut 60 being positioned so as to be coming into threaded engagement with the threaded gripping portion 70. In addition, there is shown a second tube member 18 located forwardly of the left tube member 18, with the second member telescopically fitting inside the forward end of the left tube member 18.

As the compression nut 60 is threaded onto the gripping portion 70 of the tube engaging section 58, the compression nut 60 presses the fingers 92 of the gripping portion 70, and also the tube fingers 102 of the tube 18 in an inward direction so that the inner surfaces of the fingers 92 press the tube fingers 102 inwardly to press against the outer surface 109 of the right tube member 18, and thus cause locking engagement between the right and left tube members 18, as shown in FIG. 4.

Figure 7:
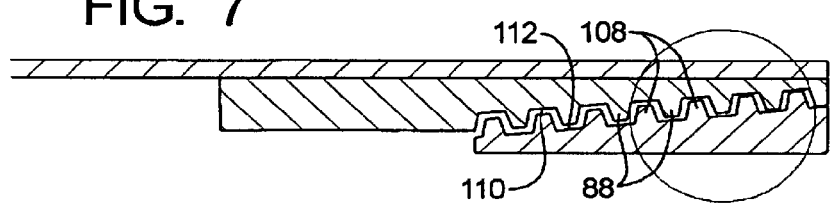
FIG. 7 is sectional view taken at a plane extending through a longitudinal axis of the tube connector, and showing one circumferential portion of the engaging threads of the connector.
Figure 8:
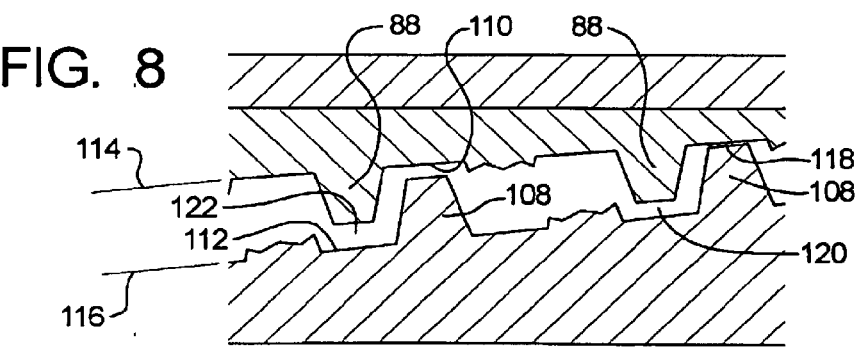
FIG. 8 is a sectional view similar to FIG. 7, but showing only four longitudinally spaced threads of the connector drawn to an enlarged scale and illustrating various dimensional and configuration relationships.

To describe in more detail the interaction of the threads 88 of the gripping portion 70 with the threads 108 of the compression nut 60, reference is made to FIGS. 7 and 8, which are longitudinal sectional views taken in a plane that is radially aligned from the center axis of the connector through one portion of the threads.

In FIG. 7, there are shown the inwardly facing threads 108 of the compression nut 60, and also the threads 88 on the gripping portion 70. For purposes of description, each of the threads 88 and 108 will be referred to as the "ridges", and the recessed grooves between the threads 88 and 108 will be called the "valleys", with the valleys gripping portion 70 being designated 110, and those valleys of the compression nut designated 112.

The angle of the rear to forward slope of the ridges 88 of the gripping portion 70 is slightly less than the angle of slope of the ridges 110 of the compression nut 60. Also, the height of the ridges 88 of the gripping member 70 is slightly less than the height of the ridges 110 of the aluminum compression nut 60. To illustrate this, reference is made to FIG. 8 which shows only two of the inner teeth 88 of the gripping portion 70 spaced apart from one another with the intervening teeth missing, and in like manner, there are shown only two of the ridges 108 of the compression nut 60. The angle of slope as well as the depth dimension of the teeth 88 and 108 is exaggerated for purposes of illustration.

In viewing FIG. 8, it can be seen that when a line 114 is drawn through the valleys 110 of the gripping portion 70, and a line 116 is drawn through the valleys 112 of the compression nut 60, these lines are not parallel, but rather they slant away from each other in a rearward direction. Also, the ridges 88 of the gripping portion 70 are uniform in height and are slightly greater in height than the ridges 108 of the plastic compression nut 60. Therefore, for any two adjacent ridges 108 and 88, the flat peak portions of the ridges 88 will be moderately further from the adjacent valleys 112, while the flat peaks of the adjacent ridge 108 will be slightly closer to its related valley 110.

Thus, as the compression nut 60 is being threaded onto the fingers 92 of the gripping portion 70, the more forward ridges 108 and 88 will be closer to engaging their related valleys 112 and 110, than those that are at the rear end (those at the left as seen in FIGS. 7 and 8). The effect of this is that the forward ends 96 of the fingers 92 will first be pressed against the adjacent end portion 78 of the tube 18.

Also, it is noted that as the ridges 108 and 88 inter-engage, the ridges 108 of the compression nut 60 will come into engagement with their related valleys 110, while there will be a slight gap between the adjacent ridges 88 and their related valleys 112. Thus, the aluminum metal which forms the compression nut 60, and thus also the ridges 108, shall bear against the plastic surfaces at the related valleys 110 prior to the time that the ridges 88, made of a plastic material of the gripping portion 70, will bear against the aluminum metal surfaces at the valleys 112. Since the plastic material of the gripping portion 70 is somewhat more yielding and more prone to wear that the aluminum metal of the compression nut 60, the wear will occur primarily in the plastic material of the fingers 92 of the gripping portion 70.

By way of example, as the compression nut 60 is coming into engagement with the gripping fingers 92 of the gripping portion 70, the gap indicated at 118 is between 0.000 to 0.005 inch, while the gap at the location indicated at 120 would be between 0.010 to 0.005 inch. Then, the gap indicated at 122 at the left side of FIG. 8 could be between 0.010 to 0.020 inch. Thus, before the plastic material of the gripping portion 70 has worn down to any great extent (and also before there has been any great depreciable wear on the aluminum compression nut 60), the engagement of the compression nut 60 and the gripping portion 70 will be primarily at the forward ends of the ridges 108 of the compression nut 60. However, as wear continues, the region of the engaging surface portions of the compression nut 60 and the gripping nut 70 will expand closer to the rear end. Obviously, depending on various factors, these relative dimensions could be varied upwardly or downwardly by percentage values upwardly or downwardly by increments of ten percent up to one hundred percent, two or three hundred percent, or greater.

Also, since the contact is initially between the ridges 108 of the compression nut 60 engaging these valleys 110 of the gripping portion 70, the initial wear will be in the plastic material in the valley 110, even prior to the time that the ridges 88 of the gripping portion 70 engage the valleys 112 of the compression nut 60. As the wearing continues, the ridges and valleys of the more rear portion of the compression nut 60 and the gripping portion 70 will be coming into contact with one another.

It has been found that with this arrangement of the compression nut 60 and the gripping fingers 92 pressing ultimately against the tube fingers 102 so as to press these into engagement with the inner tube portion, with the effect that there is relative longitudinal travel between the two, along with the tapering configuration, it is only necessary to turn the compression nut 60 about one-quarter to one-half a turn (i.e., 90 degrees to 180 degrees), to move the compression nut 60 into its locking position.

Figure 9:
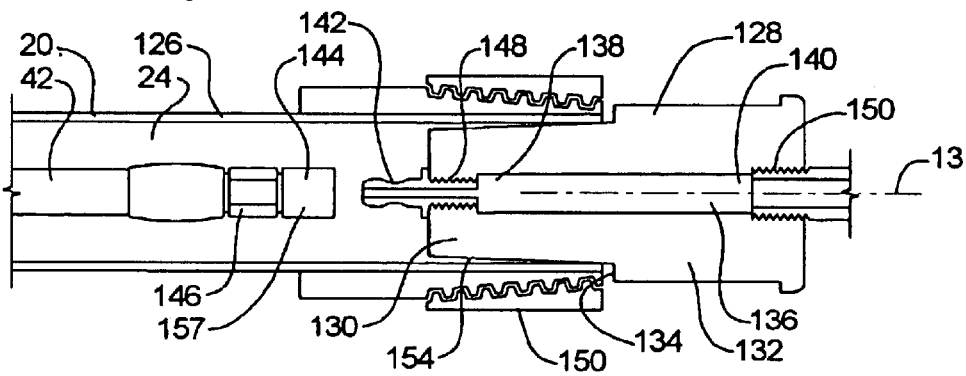
FIG. 9 is a longitudinal sectional view of a forward outlet section at the outer working end of the telescoping tube section.

There will now a description of the forward outlet section with reference to FIG. 9, where there is shown the forward end portion 126 of the forward working end tube member 22, which defines the forward end portion of the hose passageway 24. This outlet section 44 comprises an outlet housing 128 which has a generally cylindrical stepped configuration, and comprises a rear cylindrical housing portion 130 of a lesser diameter, and a forward cylindrical housing portion 132 of a slightly larger diameter, with these two housing portions 130 and 132 being centered on the longitudinal center axis 13 of the telescoping tube section 12. There is an annular shoulder or step 134 at the juncture of the housing portions 130 and 132 being aligned in a transverse plane relative to the longitudinal center axis 13.

The housing 128 has a through passageway 136 having a rear inlet end 138 and a forward outlet end 140. At the rear outlet end 138, there is positioned a male portion 142 of a quick disconnect coupling 144, and the other female portion 146 of the quick disconnect coupling 144 is connected to the forward end of the hose 42. The rear inlet end 138 of the passageway 136 is formed with interior threads 148 to engage the male portion 142 of the coupling 144.

At the forward outlet end 140 of the outlet passageway 136, there are interior threads 150 which provide a means for connecting various working members to the outlet housing 128, such as the aforementioned nozzle 46. At the forward end of the tube member 22, there is a locking/connecting member 152 which is or may be identical to the locking/connector 56 described previously herein. Thus, with the rear housing portion 130 positioned within the forward end of the tube member 22, the connector 152 locks the outlet housing 128 in place. It will be noted that the outer cylindrical surface 154 of the rear housing portion 130 has a slight rearward and inward taper which facilitates insertion into the forward end of the tube member 22. Also, as will be described later herein, this facilitates connecting to an adapter 156 for the outlet housing 128 (this adapter 156 being described later herein with reference to FIG. 16).

In its normal operating position, the outlet section 44 is arranged with the outlet housing 128 having its rear portion 130 mounted in the forward end of the tube member 22, and with the connecting member 158 having the compression nut 60 in its locking position. The quick disconnect coupling is in its connecting position with the coupling members 142 and 146 being connected to one another. This quick disconnect coupling 144 is or may be of conventional design, and as shown herein, the female connecting portion 146 has a retractable end member 157 which can be retracted to a release position and then permitted to return to its full locking position.

At the forward end of the outlet housing 128, a suitable implement or operating member, such as the aforementioned outlet nozzle 46, could be threadedly connected to the interior threads 150 at the forward end of the housing passageway 136. Obviously, other working members can be attached, and this will be described later herein.

If it is desired to disconnect the hose 42, this can be accomplished by moving the compression nut 60 of the connector 152 to its release position by rotating the compression nut 60 one-quarter or half turn, and then the outlet housing 128 is pulled forwardly from the tube member 22 so that the coupling 144 is accessible. The rear coupling portion 146 is released from the forward coupling member 142 in a conventional manner to release the hose 42 from the housing 128.

Then, if it is desired to remove the hose 42 entirely from the telescoping tube section 12, the outlet connection 36 at the handle 28, which is shown in FIG. 3, is moved to its disconnect position to free the inlet end 40 of the hose 42 from its connection to the handle 28 of the control section 26. Then, the hose 42 can simply be pulled outwardly at the base end of the telescoping tube section 12.

This particular feature of the present invention provides several conveniences. First, if the hose 42 needs to be replaced or repaired, it is a very simple matter to remove the hose 42 from the telescoping tube section 12 and to replace it with another hose. Further, if the apparatus 10 is to be stored, the hose 42 can be totally removed from the telescoping tube section 12 and stored in a coiled configuration, and the telescoping tube section 12 can be retracted to its collapsed position by loosening the compression nuts 60 of the various connectors 56 and collapsing the tube sections 18, 20, and 22. Further, the quick disconnect inlet connection 32 at the handle 28 can be moved to its disconnecting position to disconnect the entire telescoping tube section 18 (having its handle 28 attached thereto) from the supply line 34.

Figure 10:
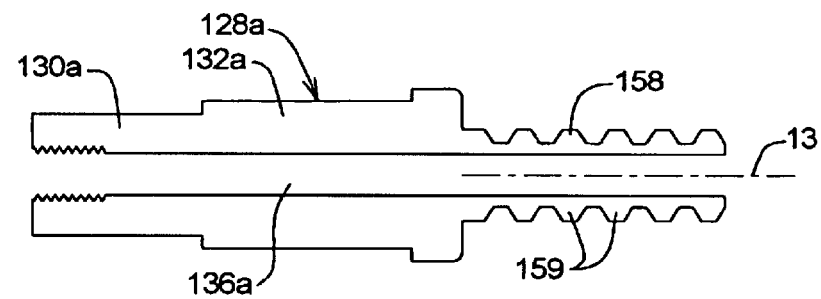
FIG. 10 is a longitudinal sectional view of a second embodiment which is a modified version of the forward outlet section.

Reference is now made to FIG. 10, which shows a second embodiment of the present invention, and this relates to the outlet section 44. Components of this second embodiment which are the same as or similar to components of the first embodiment will be given like numerical designations, with an "a" suffix distinguishing those of the second embodiment.

In the second embodiment, the outlet housing 128a has the rear and forward housing portions 130a and 132a, and also the through passageway 136a as in the first embodiment shown in FIG. 6. However, instead of having the interior forward threads 150, the outlet housing 128a has a forwardly extending connecting member 158 which has a generally cylindrical shape and is centered on the longitudinal axis 13. This forward connecting member 158 is provided with exterior threads 159 to connect to various implements, such as a brush 160 which is shown in FIGS. 11–13.

Figure 11:
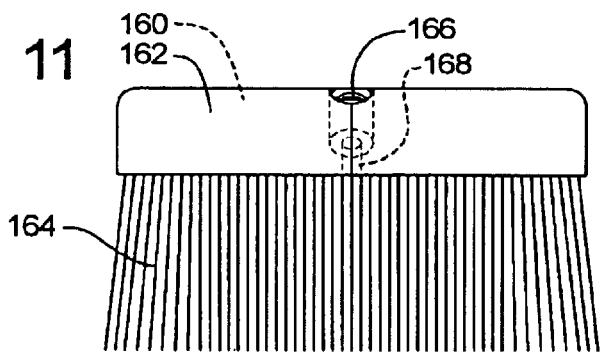
FIG. 11 is an elevational view of a brush which can be used in the present invention by being mounted to the forward working end of the apparatus.
Figure 12:
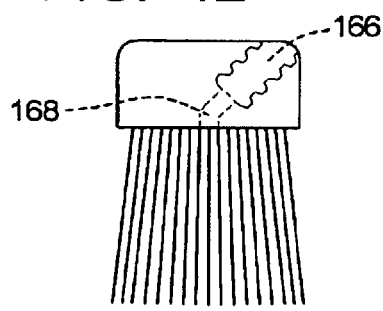
FIG. 12 is a side elevational view of the brush of FIG. 11.

In FIGS. 11 and 12, there is shown a brush 160 which may have an overall conventional configuration, such as having a mounting block 162 made possibly of wood or some other material, and the bristles 164 of the brush 160 extending outwardly from the block 162. There is provided a threaded socket 166 which can receive the threaded connecting member 158. Further, leading from the socket 166, is a further passageway 168 which leads into the upper interior portion of the bristles 164 so that water can be directed into the bristles 164.

Figure 13:
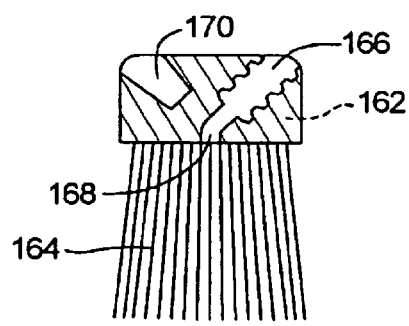
FIG. 13 is a side elevational view of a modified version of the brush of FIG. 11, showing a threaded connection/outlet of the brush of FIG. 11, and also a second non-threaded socket.

In FIG. 13, there is shown a brush 160 which is substantially the same as shown in FIG. 11, except that the block 162 is provided with a conventional socket 166 that could be connected to a conventional elongate handle that fits into a brush socket and secured therein by a bonding agent, retaining screw or nail, etc.

Figure 14:
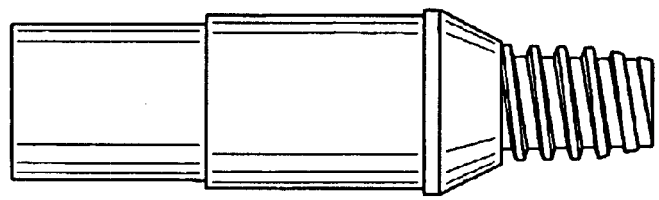
FIG. 14 is a elevational view of a housing and connecting section of a third embodiment of the present invention.

To describe yet a third embodiment of the present invention, reference is now made to FIGS. 14 and 15. Components of this third embodiment which are the same as, or similar to, components previously described herein with respect to other embodiments, will be given numeric designations distinguishing those of this third embodiment.

FIG. 14 shows the third embodiment of the present invention in side elevational view, and this is a modified form of the outlet connection shown in second embodiment of FIG. 10. In describing this third embodiment, components which are similar to those shown in previous embodiments will be given like numeric designations with a "b" suffix distinguishing those of the third embodiment.

As in the second embodiment of FIG. 10, the outlet section 44b comprises the outlet housing 128b having the rear and forward housing portions 130b and 132b, and there is the threaded rear end portion and the through passageway 136b (shown in FIG. 15). There is a forward connecting portion 158b which is configured differently from the forward connector 158a of the second embodiment of FIG. 10.

To explain the purpose of this, one of the problems encountered in making a threaded connection to another member, such as the brush 160 shown in FIGS. 11 and 12, is that the socket 166 (see FIG. 11) might have a larger or smaller diameter. Also, sometimes the threads in the socket are somewhat worn, and it is difficult to make a good connection with a connecting member which is shown at 158 of FIG. 10. This third embodiment is designed to alleviate this problem.

It will be noted by observing FIG. 14 that there are five threads (or "ridges" as described previously) on the connecting member, and as shown in FIG. 14 the forward two threads increase in diameter in a forward to rear direction, and also the angle of forward and inward slope of the outer surfaces of the forward two threads increase in a forward direction. The diameter of the rear three threads increase in a forward to rear direction but to a slight degree, and the slope of each is only moderately slanted. To describe these in greater detail, reference will now be made to FIG. 15 where there is shown only the forward upper half of the connecting portion 158b, which shows the threads in cross-section drawn to an enlarged scale.

As can be seen in FIG. 15, the five threads in the connector 158b are given designations beginning at the forward end and going rearwardly of 172, 174, 176, 178, and 179. Each of these threads 172–179 has a radially outward circumferential surface, and in a forward to rear direction these are designated, respectively, 180, 182, 184, 186, and 187. These threads 172–179 are longitudinally spaced from one another by equal spacing distances, and the longitudinal width dimension of each of these threads 172–179 are the same.

As indicated above, the threads 172–179 differ from one another in that the diameter (and of course also the radius) of the threads 172–179 increases in a rearward direction, and also the slope of each of the outwardly facing surfaces 180–186, have a different slant progressing from a sharper downward and forward slant at the forward two thread surfaces 180 and 182, and only a lesser slant at the rear three surfaces 184, 186, and 187. The angle of slant is measured relative to a plane that passes through the longitudinal center axis 13 and extends radially outwardly to cut across the threads 172–178, and the angle of slant is equal to the angle made by a line positioned in that reference plane and extending in the plane of the outer surface 180–187 to the longitudinal axis.

To describe the various angular dimensions, reference is made to FIG. 15 which shows the connecting portion 139 drawn to an enlarged scale. It can be seen that the two lines indicated at 178 represent the slope of the first two threads 180 and 182 which is about 12 degrees relative to the longitudinal axis. The length in inches along the longitudinal axis where the twelve degree slope exists is up to the longitudinal location indicated at 189 as being the 0.320 inches.

From that point on, the angular of slope is indicated by the line 190, and this is a very shallow slope which is expressed in the amount of increase in diameter relative to longitudinal distance. At the location 189 at the 0.320 inch station measured along the longitudinal axis from the 0.0 inch location at the front end, to the forward location at the 0.920 inch station indicated at the very forward end of the threaded connecting portion 159b, the increase in diameter at the 0.320 station and the 0.920 location, increases from 0.7448 to a radial dimension of 0.778 inch. Thus, the angle of slope is the tangent angle of 0.025, which is very close to one and one-half degrees. Thus, the angle of slope of the surfaces of the final three threads is approximately one and one-half degree slope in an inward forward direction.

It is evident that these slopes could be varied, and the forward twelve degree slope could vary by one degree increments of thirteen degrees, fourteen degrees, up to possibly eighteen to twenty-five degrees, and also within the broader scope by one degree increments to eleven degrees, ten degrees, and even possibly down to one degree increments down to about five degrees. Further, the more gentle slope of the rear three threads 176, 178, and 179 could vary by one-half degree increments down to zero, or conceivably even to have a opposite slope, or increase by half degree increments up to four, five, or six degrees. However, significant departures from the relative dimensions and angles as given in the preferred form are believed to diminish the effectiveness of this connector of the third embodiment.

Further, although there is shown to be a forward set of threads having one slope and a rear set of threads having one slope, and a rear set of threads having another slope, it is to be understood that there could be more than two groups of threads having changes of slope and also radial dimension, and it could be for example, that there would be a change in slope and/or radial dimension in a diminishing rate of change from the forward end to the rear end.

To describe the operation of this third embodiment, let us assume that a connection is to be made with a socket, such as the socket 168, which has a relatively small diameter. In this instance, when the connector 158b is positioned in the outward part of the socket, possibly only the thread 172 and part of the second thread 174 would fit into the socket. Therefore, after about one and one-half to two turns have been made to cause locking threaded engagement, possibly only the first and second threads 172 and 174 are actually in locking engagement.

Now let us now take the instance where there is a larger diameter socket, such as shown at 168. In this instance, the forward tapered end of the connector 158b will cause the connector 158b to become centrally positioned, and then after one or two rotations of the connector 158b relative to the socket, the threads 174, 176, and 178 may come into locking engagement, or possibly only the two rearmost threads 178 and 179.

It has also been found that this particular thread configuration of the connector 158b substantially enhances the capability of this connector 158b for connecting not only to a variety of sizes of connecting sockets, but also sockets where the threads have become worn.

To summarize the configuration of the connector 158b, it can be seen that the threads 172–179 have a radial dimension pattern where the radius of the threads increases in a rearward direction from the forward end of the connector rearwardly, where the threads are in a helical pattern and the rate of increase in the radius of the threads decreases in a rearward direction. In like manner, the angle of the taper of the surfaces 180–187 decreases in a forward to rear direction, with the rate of decrease decreasing in a rearward direction.

Figure 16:
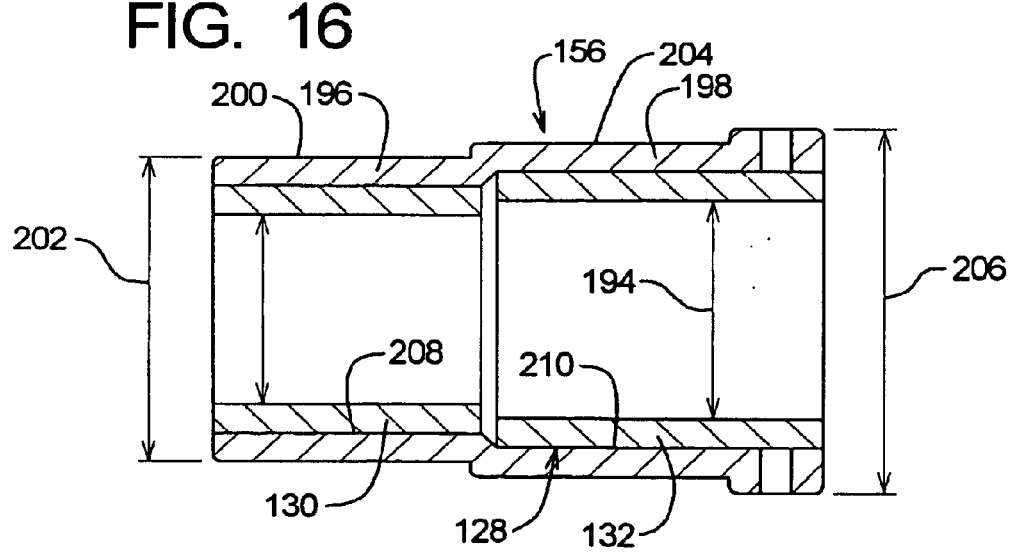
FIG. 16 is a sectional view showing an adapter with which enables the outlet section to be used with tubes of different inside diameters.

Reference is now made to FIG. 16, which shows the aforementioned adapter 156 for the outlet housing 128. As indicated previously, it may be that different diameter tubes 18 are used so that the forwardmost tube member 22 has a larger inside diameter. If so, this adapter 156 can be used.

As indicated previously, the outlet housing 128 has a smaller diameter rear portion 130, and a larger diameter forward portion 132. By way of example, let us assume that the diameter of the rear portion 130, indicated at 192 in FIG. 16 is one and one-eighth inch, and the diameter of the forward housing portion 132, shown at 194, is one and one-quarter inch. If the tube inside diameter is increased from one and one-eighth inch to one and one-quarter inch, then the same housing 128 is used but the forward housing portion 132 is positioned within the forward connecting end of the forward tube member 22.

However, if the inside diameter of the tube is increased from one and one-quarter inch to one and three-eighths inch, then the adapter 156 is needed. The adapter 156 has substantially the same outer circumferential configuration as the housing 128, except that the outside diameters are increased. Thus, there is a rear cylindrical adapter portion 196 and a forward cylindrical adapter portion 198, and the outer surface 200 of the rear portion 196 has a diameter of one and three-eighths inch, this diameter being indicated at 202. The diameter of the outer surface 204 of the forward section 198, is indicated at 206, and this is one and one-half inch. Therefore, depending upon whether the size of the inner diameter of the tube 22 is one and three-eighths inch or one and one-half inch, either the rear adapter portion 196 or the forward adapter portion 198 is inserted within the open end of the tube section 22.

To complete the description of the adapter 156, this adapter 156 has an interior cylindrical recess 208, with a forward recess portion 210 being slightly larger than the outside diameter of the forward housing section 132, and a rear recess portion 212 having a diameter just slightly larger than the outside diameter of the rear housing portion 130.

Figure 17:
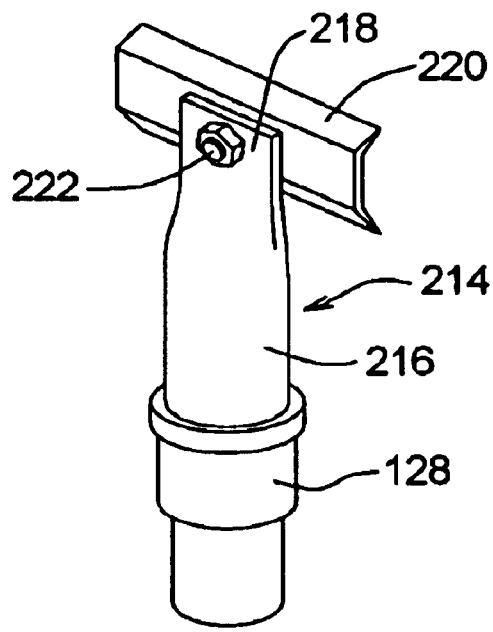
FIG. 17 is an isometric view of a working implement adapted to be used in connection with the present invention.

Reference will now be made to FIG. 17, which shows another implement or tool 214 which could be utilized in the apparatus 10. This tool 214 is attached to the aforementioned outlet housing 128, and comprises a rear mounting member 216 that has an upper attachment end 218. Connected to the attachment end 218 is a scraper 220, which is or may be of conventional configuration with a connection being made in a conventional manner, such as by a nut and bolt attachment 220.

Figure 18:
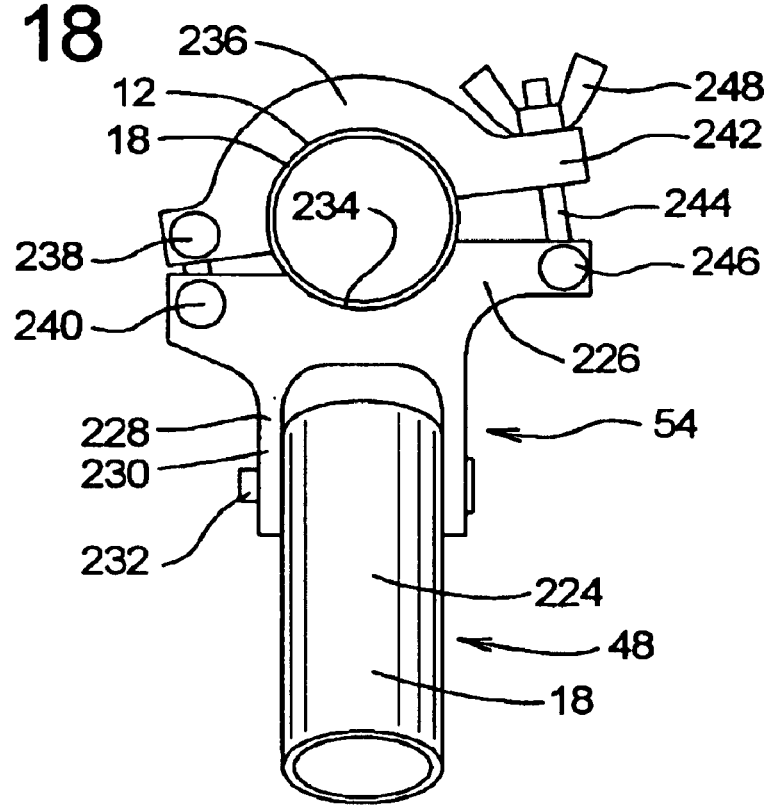
FIG. 18 is a side elevational view showing the details of a swivel connector utilized for the support tube or tubes of FIGS. 1 and 2.

FIG. 18 shows the aforementioned swivel connection 54 which is shown in FIG. 1 attached to the telescoping tube section 18. There is shown the upper end portion 224 of the upper tube section 18 of the telescoping support tube 48. Attached to this tube section 18 is a first mounting member 226 having a U-shaped connecting portion 228 with the two arms 230 of the U-shaped connecting section being positioned on opposite sides of the upper tube portion 224, and having a swivel connection provided by a cylindrical retaining pin 232 providing the swivel connection. The upper part of the mounting member 226 has a cylindrically curved recess 234 at its upper surface which engages a surface portion of a tube member 18 of the main telescoping tube section 12.

There is an upper mounting member 236 having a pivot connection at 238 to one end portion 240 of the aforementioned mounting member 228. At the opposite side of the upper member 236, there is a protruding portion 242 which receives a threaded connector 244 that is pivotally mounted at 246 at a location opposite to that of the location 240. There is a wing nut 248 which engages the protruding member 242, so that rotation of the wing nut 248 can press the upper clamping portion 236 downwardly to proper engage the pipe section 18 of the telescoping tube section 12.

In operation, it can be seen that the swivel connection 54 permits relative rotational movement between the support tube 48 and the main telescoping tube section 12 in a plane that is occupied by both the telescoping tube section 18 and the support tube 48.

It is evident that various modifications could be made to the present invention without departing from the basic teachings thereof.

I claim:

1. A pressure washing apparatus comprising:

a) a telescoping tube section comprising a rear end portion and a forward end portion, and defining a hose carrying passageway, said telescoping tube section having a longitudinal center axis extending along said tube passageway, and comprising at least a rear tube member and a front tube member;

b) a control section located at the rear end portion of the telescoping tube section and having a water supply inlet connector adapted to be connected to a water supply line, a hose inlet connector adapted to be connected to a rear end of a hose that extends through the telescoping tube section, and a control mechanism to control water flow from the water supply inlet connection to the hose inlet connector;

c) a forward outlet section mounted to the forward end of the telescoping tube section and comprising a hose outlet connection arranged to have a releasable connection to a forward outlet end of a hose in the hose passageway, said forward outlet section being arranged to permit access to the releasable connection, whereby a hose in the telescoping tube section can be connected and disconnected to the hose outlet connection and the hose inlet connector for insertion of the hose into an operating position in the telescoping tube section and removal therefrom;

d) at least one tube member having at an end portion thereof a releasable connector comprising a tube engaging section comprising:

i) a rearwardly positioned sleeve portion arranged to extend substantially around the first tube and be secured thereto;

ii) a forwardly positioned gripping portion having a forward end portion and rear end portion, and comprising a plurality of gripping fingers arranged to be positioned at spaced circumferential locations, each of said fingers having a rear base end portion connected to the sleeve portion, a forward end finger portion, and an interior gripping surface;

iii) said gripping portion having a tapered outer surface portion comprising outer tapered surface portions of said gripping fingers, each outer tapered surface portion sloping in a forwardly and longitudinally inward taper toward the forward end finger portion of the forward gripping portion;

iv) said gripping portion having an outer tapered surface formed with exterior threads which follow the taper of the outer tapered surface so that the outer diameter of the exterior threads increase in a rearward direction, with said exterior threads extending across and through the outer tapered surface portions of the gripping fingers;

e) a compression nut having a tapered inwardly facing compression surface arranged to extend around the gripping portion, said tapered inwardly facing compression surface of said compression nut having interior threads tapering outwardly in rearward direction and being arranged to come into threaded engagement with the exterior threads of the forward gripping portion.

2. The apparatus as recited in claim 1, wherein the sleeve portion of the tube engaging section is fixedly attached to the outer surface of its related tube member a short distance away from a forward edge of its related tube member, and the forwardly positioned gripping portion extends forwardly from the sleeve portion toward the adjacent forward edge portion of its related tube member, said gripping portion and that portion of its related tube member which is immediately adjacent to the gripping portion each being formed with longitudinal slots which define said gripping fingers of the gripping portion, and also form the end tube portion that is adjacent to the gripping portion as tapered fingers of the end portion of the tube member, whereby when the compression nut is rotated to move the gripping fingers inwardly, the tube fingers also move inwardly with the tube fingers gripping an adjacent portion of a tube member positioned within the related tube member with the releasable connector.

3. The apparatus as recited in claim 2, wherein the forward threaded end portion comprises at least one forward thread portion and at least a part of a second thread portion, having a slope at a slant angle between about six degrees to twenty degrees.

4. The apparatus as recited in claim 3, wherein said angle of slant is between about nine degrees and five degrees.

5. The apparatus as recited in claim 3, wherein the threads in the rear thread portion have an angle of slant between zero and five degrees.

6. The apparatus as recited in claim 1, wherein the tapered outer surface portion of the gripping portion has an angle of taper which is slightly less than an angle of taper of the threads of the compression nut, so that with the compression nut at least partially threaded onto the gripping portion, forward threads of the gripping portion and the compression nut are located relatively closer to one another than more rearward threads of the gripping portion and the compression nut.

7. The apparatus as recited in claim 6, wherein the compression nut is made of a relatively hard metal, and the gripping portion is made of a more yielding plastic, the threads of each of the gripping portion and the compression nut being formed as ridges and valleys between the ridges, said threads of the compression nut and the gripping portion being configured so that a radial length dimension of the ridges of the compression nut is moderately greater than a radial dimension of the ridges of the gripping fingers, so that as the threaded portions of the compression nut come into engagement with the valleys of the gripping portion, the ridges of the compression portion are spaced moderately away from the valleys of the compression nut, whereby prior to any appreciable wear on the gripping fingers and the compression nut, more forward thread portions of the compression nut and the gripping portion come into engagement with the ridges of the compression nut coming into initial engagement, and as wear progresses, engagement of the threaded portions increase in a rearward direction, and the ridges of the gripping fingers are positioned more closely to the valleys of the compression nut.

8. A pressure washing apparatus comprising:
a) a telescoping tube section comprising a rear end portion and a forward end portion, and defining a hose carrying passageway, said telescoping tube section having a longitudinal center axis extending along said tube passageway, and comprising at least a rear tube member and a front tube member;
b) a control section located at the rear end portion of the telescoping tube section and having a water supply inlet connector adapted to be connected to a water supply line, a hose inlet connector adapted to be connected to a rear end of a hose that extends through the telescoping tube section, and a control mechanism to control water flow from the water supply inlet connection to the hose inlet connector;
c) a forward outlet section mounted to the forward end of the telescoping tube section and comprising a hose outlet connection arranged to have a releasable connection to a forward outlet end of a hose in the hose passageway, said forward outlet section being arranged to permit access to the releasable connection, whereby a hose in the telescoping tube section can be connected and disconnected to the hose outlet connection and the hose inlet connector for insertion of the hose into an operating position in the telescoping tube section and removal therefrom;
d) said forward outlet section comprising an outlet housing removably mounted to the forward end portion of the telescoping tube section, with said outlet housing providing a through passageway connecting to the hose outlet connection of the forward outlet section;
e) said forward outlet section being removably connected to the forward end of the telescoping tube section by a releasable connector comprising a tube engaging section comprising:
  i) a rearwardly positioned sleeve portion arranged to extend substantially around the first tube and be secured thereto;
  ii) a forwardly positioned gripping portion having a forward end portion and rear end portion, and comprising a plurality of gripping fingers arranged to be positioned at spaced circumferential locations, each of said fingers having a rear base end portion connected to the sleeve portion, a forward end finger portion, and an interior gripping surface;
  iii) said gripping portion having a tapered outer surface portion comprising outer tapered surface portions of said gripping fingers, each outer tapered surface portion sloping in a forwardly and longitudinally inward taper toward the forward end finger portion of the forward gripping portion;
  iv) said gripping portion having an outer tapered surface formed with exterior threads which follow the taper of the outer tapered surface so that the outer diameter of the exterior threads increase in a rearward direction, with said exterior threads extending across and through the outer tapered surface portions of the gripping fingers;
f) a compression nut having a tapered inwardly facing compression surface arranged to extend around the gripping portion, said tapered inwardly facing compression surface of said compression nut having interior threads tapering outwardly in rearward direction and being arranged to come into threaded engagement with the exterior threads of the forward gripping portion.

9. A pressure washing apparatus comprising:
a) a telescoping tube section comprising a rear end portion and a forward end portion, and defining a hose carrying passageway, said telescoping tube section having a longitudinal center axis extending along said tube passageway, and comprising at least a rear tube member and a front tube member;
b) a control section located at the rear end portion of the telescoping tube section and having a water supply inlet connector adapted to be connected to a water supply line, a hose inlet connector adapted to be connected to a rear end of a hose that extends through the telescoping tube section, and a control mechanism to control water flow from the water supply inlet connection to the hose inlet connector;

c) a forward outlet section mounted to the forward end of the telescoping tube section and comprising a hose outlet connection arranged to have a releasable connection to a forward outlet end of a hose in the hose passageway, said forward outlet section being arranged to permit access to the releasable connection, whereby a hose in the telescoping tube section can be connected and disconnected to the hose outlet connection and the hose inlet connector for insertion of the hose into an operating position in the telescoping tube section and removal therefrom;

d) said forward outlet section comprises a connector adapted to make a threaded connection with different members having variously sized and/or shaped threaded sockets, said connector comprising:
  i) a connecting section having a longitudinal center axis, a forward end, a rear end, and a surrounding threaded surface portion comprising a forward threaded end portion, and a rear threaded end portion, which in turn comprise a plurality of outwardly facing thread members;
  ii) said thread portions being connected in a generally helical pattern, with a radial dimension of the thread members of the forward threaded end portion generally increasing in at a first rate of increase which is greater than zero in a rearward direction from a forward end of the forward threaded end portion to a more rear location of the forward threaded end portion, and with the rear threaded end portion having a radial dimension which is characterized in that any rate of increase in the radial dimension in a forward to rear direction is less than the rate of increase in the forward threaded end portion;
  iii) the threaded members of the forward threaded end portion and the rear threaded end portion each having a radially outwardly facing perimeter surface, with the perimeter surfaces of the forward threaded end portion having an inwardly and forwardly extending slope relative to the longitudinal axis at an angle of slope measured in a geometric plane passing through the longitudinal center axis, and any slope of the perimeter surfaces of the thread members of the rear threaded end portion being characterized that any inwardly and forwardly extending slope of the threaded members of the rear threaded end portion is less than the slope of the forward threaded end portion.

* * * * *